United States Patent [19]
Clarke

[11] Patent Number: 6,093,763
[45] Date of Patent: Jul. 25, 2000

[54] HIGH TEMPERATURE SILICON SEALANT

[75] Inventor: William A. Clarke, Orange, Calif.

[73] Assignee: The Gasket King, LLC., Irvine, Calif.

[21] Appl. No.: 09/185,281

[22] Filed: Nov. 3, 1998

[51] Int. Cl.⁷ .............................. C08J 5/10; C08K 3/38; C08L 83/00

[52] U.S. Cl. ......................... 524/404; 524/267; 524/399; 524/588

[58] Field of Search .................................. 524/261, 265, 524/266, 267, 404, 413, 588, 399

[56] References Cited

U.S. PATENT DOCUMENTS

| | | | |
|---|---|---|---|
| 4,927,587 | 5/1990 | Takahashi et al. | 264/211 |
| 4,942,211 | 7/1990 | Sommer et al. | 528/14 |
| 5,552,466 | 9/1996 | Beckley et al. | 524/265 |

*Primary Examiner*—James J. Seidleck
*Assistant Examiner*—U. R. Rajguru
*Attorney, Agent, or Firm*—Robert M. Meade; Anthony T. Cascio

[57] ABSTRACT

A high temperature silicon sealant comprising a combination of high molecular weight, high viscosity silicon oil; a low molecular weight, low viscosity silicon oil; a liquid organo-metallic catalyst; and a submicron boron nitride powder.

3 Claims, No Drawings

HIGH TEMPERATURE SILICON SEALANT

FIELD OF INVENTION

The present invention relates to a high temperature silicon sealant for sealing metal to metal, plastic to plastic and composite to metal, and, more particularly, to such a sealant which is ideally suited to seal to such surfaces the laminated resin articles described in the concurrently filed United States patent application, Docket 98BC-1, entitled "Boron Nitride/Silica Catalyzed Polysiloxane Resin and Laminated Articles Formed Therefrom", which is incorporated herein by this reference.

BACKGROUND

Current sealants are limited in use to temperature below 600° F. because of their high organic molecular content. Such sealants also commonly use solvents in their processing or in their application to the surfaces to be sealed. Further, current sealants degrade as their surrounding temperatures increase and tend to perform less effectively as the temperature of clamping systems to which they are commonly applied increase. Still further, to be effective,current sealants require relatively thick application to the surfaces they are sealing and do not function adequately if the surfaces are marred or scratched. Thus, there is a need for an improved sealant which overcomes the foregoing shortcomings of current sealants. The present invention satisfies such a need by providing a solventless silicon sealant which will seal to marred and scratched surfaces and which preforms effectively at and above 600° F. and, in fact, improves in effectiveness as the temperature of the surrounding environment and clamping system increase.

SUMMARY OF INVENTION

To accomplish the foregoing, the sealant of the present invention comprises a combination of high molecular weight, high viscosity silicon oil; a low molecular weight, low viscosity silicon oil; a liquid organo-metallic catalyst; and a submicron boron nitride powder. In such a combination, the low viscosity silicon oil functions as a high wetting agent and increases the surface contact for the high viscosity silicon oil. The submicron boron nitride functions as a sealant keeping the resulting system rubbery, as a plastizer, as a secondary high temperature catalyst, as a ceramic lubricant and as a thermo-conductor increasing heat transfer through the sealant.

DETAILED DESCRIPTION OF INVENTION

The composition of an example of the preferred embodiment of the present invention is as follows:

| Component | Weight | Weight % |
|---|---|---|
| Dimethyl polysiloxane silanol | 100 g | 56.67 |
| Methylsiloxane resin | 50 g | 28.33 |
| boron nitride | 17.647 g | 10 |
| zinc 2-ethylhexanoate | 8.824 g | 5 |
| Total content: | 176.471 g | 100 |

The demethyl polysiloxane silanol is an example of the preferred low molecular weight, low viscosity silicon oil and is available from GE Silicones as TRP 178. The methylsiloxane resin is an example of the preferred high molecular weight silicon oil and is available from GE Silicones as TRP 179. The zinc 2-ethylhexanoate is a liquid catalyst commercially available as SRCO6. The submicron boron nitride is a powder commercial available from Cerac, Inc. as item number B-1084 or from Carborundum Company as product number PSHP610.

When the sealant of the present invention is used in the manufacture of laminated articles as described in the previously referenced concurrently filed patent application, it is applied to the outer surfaces of the article between lamination operations to aid in bonding together the laminations. When the sealant is used in the application of such laminated articles such as gaskets and washers, it is coated on the upper and lower surfaces of the article in thicknesses of about 0.0004 inch and with the article subjected to an elevated temperature of about 235° F. for about 30 minutes and then to a further elevated temperature of about 450° F. with the process being repeated as desired to build up the sealed gasket and washer surfaces. When the sealant is used to seal a laminated article such as a gasket to the head of an engine, the sealant is applied to the head and/or block clamping surfaces of the engine which has been pre-cleaned and is cured during engine operation. In flowing onto the clamping surfaces, the sealant penetrates and fills any pores and scratches in the clamping surfaces to block gas escape paths between the gasket and the clamping surfaces. In practice, the use of the sealant of the present invention in such applications has been found to result in a significant sealing time improvement for the gaskets tested.

What is claimed is:

1. A high temperature silicon sealant comprising:
   a high molecular weight, high viscosity silicon oil of a methylsiloxane resin;
   a low molecular weight, low viscosity silicon oil of a dimethyl Polysiloxane silanol functioning as a high wetting agent increasing surface contact for the high viscosity silicon oil, and having a weight percent about twice that of the high molecular weight, high viscosity silicon oil;
   a liquid organo-metallic catalyst; and
   a submicron boron nitride powder functioning as
   (i) a sealant keeping the resulting system rubbery,
   (ii) a plastizer,
   (iii) a secondary high temperature catalyst,
   (iv) a ceramic lubricant and
   (v) a thermo-conductor increasing heat transfer through the sealant.

2. The combination of claim 1 wherein the liquid organo-metallic catalyst is zinc 2-ethylhexanoate.

3. The combination of claim 2 wherein the components of the sealant are present in about the following weight percentages 56.67% dimethly polysiloxane silanol, 28.33% methylsiloxane resin, 10% boron nitride and 5% zinc 2-ethylhexanoate.

* * * * *